United States Patent [19]
Dunlap et al.

[11] 3,777,557
[45] Dec. 11, 1973

[54] STRAND TESTER

[75] Inventors: Frederick A. Dunlap, Greensboro, N.C.; Lyle C. Wilcox, Clemson, S.C.

[73] Assignee: Greenwood Mills Corporation, Greenwood, S.C.

[22] Filed: Nov. 5, 1971

[21] Appl. No.: 196,069

[52] U.S. Cl. .................................. 73/95, 73/90
[51] Int. Cl. ......................................... G01n 3/08
[58] Field of Search ..................... 73/95.5, 95, 90

[56] References Cited
UNITED STATES PATENTS

| | | | |
|---|---|---|---|
| 3,365,938 | 1/1968 | Matsushita et al. | 73/95 |
| 2,081,599 | 5/1937 | Peters | 73/90 |
| 3,139,545 | 6/1964 | Dreyfus | 310/15 X |

*Primary Examiner*—Jerry W. Myracle
*Attorney*—John W. Malley et al.

[57] ABSTRACT

An apparatus for testing strands of yarn or the like whereby the yarn is attached to a unique driver which exerts a force on and elongates the yarn in accordance with an input force signal. The elongation and force applied are each respectively detected and a signal indicating each generated. A manually operated switch has a first position connecting the force signal to an operational amplifier which also receives a programming signal from a function generator so as to produce a force signal which varies the force applied in accordance with a preset force program, for example, to keep the rate of force increase constant, and a second position connecting the elongation signal to the operational amplifier together with the programming signal so as to produce an elongation signal which varies the elongation applied in accordance with a preset elongation program. A camera having a drive motor for driving film through the camera is also preferably mounted for photographing the strand during the test. A manual switch is operated to apply a voltage to the drive motor through a circuit which increases the voltage at a rate so as to accelerate the film gradually and avoid tearing and also to apply a signal through a delay circuit which enables the function generator after the camera is functioning.

25 Claims, 5 Drawing Figures

INVENTORS
FREDERICK A. DUNLAP III
LYLE C. WILCOX

BY Cushman, Darby & Cushman
ATTORNEYS

STRAND TESTER

BRIEF DESCRIPTION OF THE PRIOR ART AND SUMMARY OF THE INVENTION

The invention relates to an apparatus for testing strands of material.

This invention is described in a dissertation submitted to the Faculty of Clemson University, and approved by the head of the Electrical Engineering Deartment on Nov. 25, 1970. The contents of this dissertation are explicitly incorporated herein by reference.

For many years, the cotton industries have been processing cotton in the same fashion. The main change has been in increasing the speed of equipment that works on principles originated decades ago. As the operating speeds increase, fiber and yarn properties, as well as the relationships between the two, become more important. Temperature and humidity are important to the physical properties of yarn. With cotton yarns, temperature and humidity ranges have been established empirically for maximum production. This was adequate while there was a limited number of yarns that a mill produced; however, today blends are being changed rapidly, varying the percent of synthetic as well as the type of synthetic. If empirical results must be used, a large amount of yarn will be wasted in attempts at finding the proper temperature and humidity for maximum production.

However, temperature and humidity are only two of the physical properties that affect the mill performance of yarns. Cotton is grown in a field where it must be picked either by hand or machine. If a machine is used, the possibility of damaging the fiber begins here. From the field, the cotton goes to a gin where the trash is removed by beating and tearing open each cotton boll. The fibers are exposed to high temperatures and humidities before they go into bales.

The bales are shipped to a mill where they are opened and picked. This process uses steel fingers to tear the compressed fibers into small clumps. Now the fibers are ready to be introduced into the manufacturing process. When the fibers enter the mill they have their own physical properties. Staple length, single fiber strength, elongation, fiber texture, maturity, and fineness are a few of the important properties of the fibers. Synthetic fibers also have physical properties which, though not as variable as the cotton, influence the yarn. Staple length, single fiber strength, elongation, and denier are a few of the properties that are important in the synthetic.

Now the cotton and synthetic are taken to a blender where the various cottons and synthetics are mixed into the desired blend. For certain yarns, the blending is performed after carding. The blended cotton is then sent to the cards where final trash removal takes place and the fibers are parallelized. The card uses a wire drum running against a wire brush to separate and straighten each fiber. The carded sliver is then taken to drawing frames where it is elongated by having the take-up roll run faster than the feed roll. This results in high tension being placed on the component fibers.

From drawing, fibers are spun and twisted on roving frames onto bobbins. Next, the yarn goes to spinning where it is again drawn, twisted, and spun onto bobbins. From here the yarn is wound onto cones or beams. Next, the yarn goes to the weave room where it is woven on looms into cloth.

The primary loss in production occurs when yarn breaks during spinning or while being woven on the loom. The yarn breaks due to damage in processing or because the components of the yarn are not of sufficiently high quality. Accordingly, there is a need to extract useful information from the element that actually fails in production — the yarn.

Many different types of yarn testers have been proposed and many have been built. The appearance grade is obtained by winding a sample of yarn on a block board. The sample is then compared with a photographic standard and graded between A (excellent) and D (very poor). Yarn imperfections are visible defects which affect the quality and appearance of yarn. The imperfections include neps, naps, motes, and other protuberances which appear over short lengths of yarn.

The protuberances are sensed and counted by two main techniques. The first technique utilizes the change in capacitance as the yarn is run between two parallel plates. The second technique is photoelectric detection as the yarn is run past a photoelectric measuring head. The Uster Hy-Lo Indicator and the Brush Imperfection Counter use the capacitance technique while the Uster Imperfection Counter, Sheffield Neptel, and the Lindly Yarn Inspector use photoelectric detection.

Imperfections can cause the number of ends down (production halts) to increase. Neps can catch on yarn guides and on the traveler in the spinning frame and cause the yarn to break. For this reason, a minimum of protuberances is desirable for most yarns.

Unevenness is defined as the fluctuation in linear density of a yarn. There are two main techniques used to measure the unevenness. The first is the variation in the compressed cross-sectional area of the yarn. The second is the change in capacitance as in the imperfection counter. The Pacific Evenness Tester and the Saco-Lowell Sliver Tester use the first technique while the Brush Uniformity Analyzer and the Uster Evenness Tester are among those using the second technique.

The evenness of a yarn relates closely with the strength of a yarn. That is, a yarn that is very uneven will have a widely varying strength as samples are taken along its length. Pendulum type tensile testers are now widely used to test strength. This type of device includes a screw which is driven by a suitable motor and which attaches to one end of the strand. A pendulant member is attached to the other end and the force generated depends on the distance between the pendulant member and the end of the strand to which it is attached.

It should be noted that with the screw moving at a constant rate, the load will increase non-linearly because of the sinusoidal loading. Also, the elongation of the yarn is the relative motion between its two points of attachment. Accordingly, the pendulum tester is capable of neither constant rate of loading or constant rate of elongation.

Spring loaded testers are also widely used. For a constant rate of loading, a first motor is allowed to run at a constant speed. As this motor turns a screw, a spring which connects the screw to one end of the yarn tightens and causes the fiber to elongate. When the fiber elongates enough to touch a contact, a second motor is energized driving a second screw attached to the other end of the yarn down until the contact is no longer touched. The contact keeps the elongation of the fiber from affecting the load rate which is determined by the speed of the motor, pitch of the screw, and spring constant. The disadvantages of this system are that the tester must keep correcting for elongation in a series of discrete movements and the speed of the break must be slow enough to allow the second motor to keep the elongation neutralized. To record the break, a chart is rotated by the second motor which is proportional to the displacement and a pen is connected to the screw driven by the first motor which is proportional to the force.

For a constant rate of extension, the second motor is allowed to run at constant speed. As the second screw moves down elongating the yarn, the spring is elongated which causes another to be contacted. This causes the first motor to pull the contact back which in turn turns off the first motor. This action causes the tester to maintain a constant rate of elongation.

An inclined plane tester is also commonly used. This device gives a constant rate of loading as a lever is moved down by a driven screw. The tension on the yarn is a function of the angle the lever makes from the horizontal. A disadvantage of this system is that the inertia of the carriage which holds the yarn causes irregular loading when the yarn slips rapidly. Also bearing friction must be carefully controlled to minimize errors. The Uster yarn strength tester is one of the better known testers which uses the inclined plane principle. Its main advantage is that it can automatically test up to 200 samples of a bobbin of yarn, change bobbins and begin the test on a new bobbin. All of this is done completely automatically. The Uster load rate can be adjusted so that an approximate time to break of 20 seconds can be obtained.

A fourth tester is the ballistic or impact tester. The ballistic tester gives test results in units of work. The pendulum starts at position A and is allowed to swing to position B. At point B the yarn begins to be loaded. By measuring the height that the pendulum swings after the yarn breaks and taking the difference between this value and the initial height at point A and multiplying by the weight of the pendulum, the change in potential energy is obtained. If the pivot resistance is low and windage is neglected, the resulting energy is the energy that was imparted to the yarn. No stress-strain curve is obtained in this test.

The Instron is another instrument used for yarn testing. A screw drive is used to pull the jaws apart at a constant rate. The force is measured by a force transducer that is connected between the yarn and the Instron arms. The maximum displacement rate is 50 inches per minute. An X-Y recorder is used to record the force, which is derived from the force transducer, and the elongation which is obtained from the movement of the Instron arm.

The Fabric Research Laboratory's high speed piston tester is used for testing yarns at elongation rates of up to 80 feet per second. The lower jaw is attached to a piston that is driven down by compressed gas while the upper jaw is stationary and connected to a piezoelectric force transducer. The displacement of the moving jaw is detected by moving a magnetic tape, which has a known frequency recorded upon it, past a pickup head. The piston tester has the ability to test samples at very high speeds but cannot be used at lower speeds because the gas pressure necessary for low speeds is insufficient to break the yarn. The piston tester uses neither constant rate of force nor elongation and has no means of being programmed.

The main disadvantage of any single end tester is the time consumed in testing the samples. Operators can influence results by handling the yarn differently on different tests; therefore, great care must be used to avoid these influences from creeping in. Although the above disadvantage is avoided with the Uster single end tester, the only test that can be made is low speed constant rate of loading breaks. This test is meaningful but does not completely characterize yarn properties.

The ability of the testing instruments mentioned above to extract information necessary for modeling of the yarn is very limited. The industry needs a method to establish the mill performance of yarns without having to run large amounts of yarn in pilot production with the associated waste. The first step in eliminating these wastes is to adequately analyze the yarn; then, and only then, can machines be adjusted or developed to capitalize on the strong points of the yarns.

Most of the test runs on yarn expose the yarn to very low rates of loading. The Uster single end tester is probably the most widely used tester for single end testing of yarn. It takes approximately 20 seconds to break the yarn and uses a constant gauge length. In this application a break is defined as the point at which the yarn can no longer hold a load. Obviously, yarn does not take 20 seconds to break in production. The loads seen by the yarn have been investigated by placing a Rothschild tension transducer on a spinning frame. Although tension settings for a spinning frame are often set using average tension, the tension seen by the yarn is very dynamic.

The rate sensitivity of the yarn is a parameter that needs to be examined. This is the change in force-displacement characteristic as the load rate increases. To establish the rate sensitivity a tester with a variable load rate is needed.

Other parameters that need to be examined are the toughness or energy required to break the yarn and the relationship between the energy and the rate of loading. Yarn is damaged or broken in production by being subjected to rapidly varying tensions. For this reason, the ability of a yarn to recover from a peak force is not necessarily as important as its ability to recover from several large forces, none of which are sufficiently large to break the yarn. This means that a yarn that can absorb more energy could perform better in the mill than a yarn that has a higher ultimate break strength but cannot absorb as much energy.

There are three main loading conditions to which the yarn is subjected in processing. The first is a pure displacement loading such as that seen in drawing operations. Here, the yarn is elongated a certain percentage regardless of the force that is placed on the yarn. The second condition is a pure force loading that occurs when the tension on a spinning frame is set. The third condition is a combination of the first two, occurring when a nep or irregularity catches on a guide or on the traveler of a spinning frame. If a nep catches on the traveler, a certain force is necessary to pull the nep across the traveler at a given position. The yarn will break unless it is tough enough to pull the traveler further around on the ring which will reduce the force necessary to free the nep.

The third loading condition, a combination of force and displacement loading, is the condition over which the mill has a minimum of control. In any event both the displacement and force on the yarn are important.

Fatigue, the ability of the yarn to recover from a nondestructive load applied a number of times, needs to be established. Although the Instron is capable of a limited number of cycles, the time to run the test would be extremely long since the operator would have to reverse the machine manually at the end of each cycle.

The actual fiber to fiber action of a break in yarns needs to be examined in order to determine how and why yarn breaks. Ideally, the yarn would have the combined strength of every fiber in its cross section. This is not the case. The fibers must be slipping apart or breaking in such a manner that the full potential of the fibers is not utilized. To study this action, a high speed camera with close-up attachments or a microscope is needed.

In summary, a tester is needed to allow investigation of rate sensitivity, programmable rate of elongation characteristics, programmable rate of force characteristics, energy, fatigue, and fiber to fiber action of yarn breaking. The present invention relates to a strand testing apparatus which has this capability.

The tester of this invention can produce both low and high rates of elongation so that the rate sensitivity of the yarn can be examined. For studying first order effects, a constant rate of elongation can be provided. Low elongation rates can be obtained from a screw drive unit such as the Instron, but high rates of elongation cannot. The tester is able to produce both constant rates of elongation and programmable elongation. The latter feature is needed to extract higher order effects of yarn. The tester can provide programmable force loading. With both programmable elongation and force, the yarn is examined using either variable (elongation or force) as the independent variable with the other variable being the dependent variable. The equipment is able to show the energy absorbed by the yarn at any break rate. This is found by integrating the dependent variable (integrate the force while in the constant rate of elongation or integrate the displacement while in the constant rate of force mode). The tester has the ability to cycle the equipment to enable the fatigue of the yarn to be studied. The programmable force mode is used to study the fatigue, allowing a sinusoidal force whose magnitude is independent of the elongation of the yarn. Finally, the tester enables the researcher to examine the visible mechanics of yarn breaking.

The apparatus includes a unique driver which is attached to one end of the yarn and applies a force which varies in accordance with an input force signal. A force transducer is connected to the other end of the yarn strand for generating an electrical signal indicating the force applied and an elongation transducer is attached to the end of the yarn pulled by the driver for generating an electrical signal indicating the elongation. A manually operated switch can be set in either a first position connecting the force signal to an operational amplifier or a second position connecting the elongation signal to the amplifier, which is also connected to a function generator which generates a program signal. The operational amplifier compares the two signals and generates a force signal to change the force applied in accordance with the program signal. Thus, the program can be a constant rate of increase of either elongation or force or any other rate.

This novel apparatus as discussed below also comprises part of a system which also includes a camera mounted for photographing the strand during testing, a recorder and a stroboscope. The camera preferably includes a drive motor which drives the film through the camera and this drive motor is started by manual operation of a switch which connects a direct current voltage to the motor via a capacitive circuit which gradually builds up the voltage to the motor to prevent abrupt starting and consequent breaking of the film. The switch also operates to cause an enabling signal to be applied to the function generator via a delay circuit so that testing begins after the camera is in operation.

The unique driver includes a coil of wire wound about an annular shaped member which is movable within a housing which also contains a permanent magnet. The magnetic field generated by the coil interacts with the field of the magnet so that the force generated varies with the electrical input applied to the coil.

Many other objects and purposes of the invention will be clear from the following detailed description of the drawings.

DETAILED DESCRIPTION OF THE DRAWINGS

Figure 1:
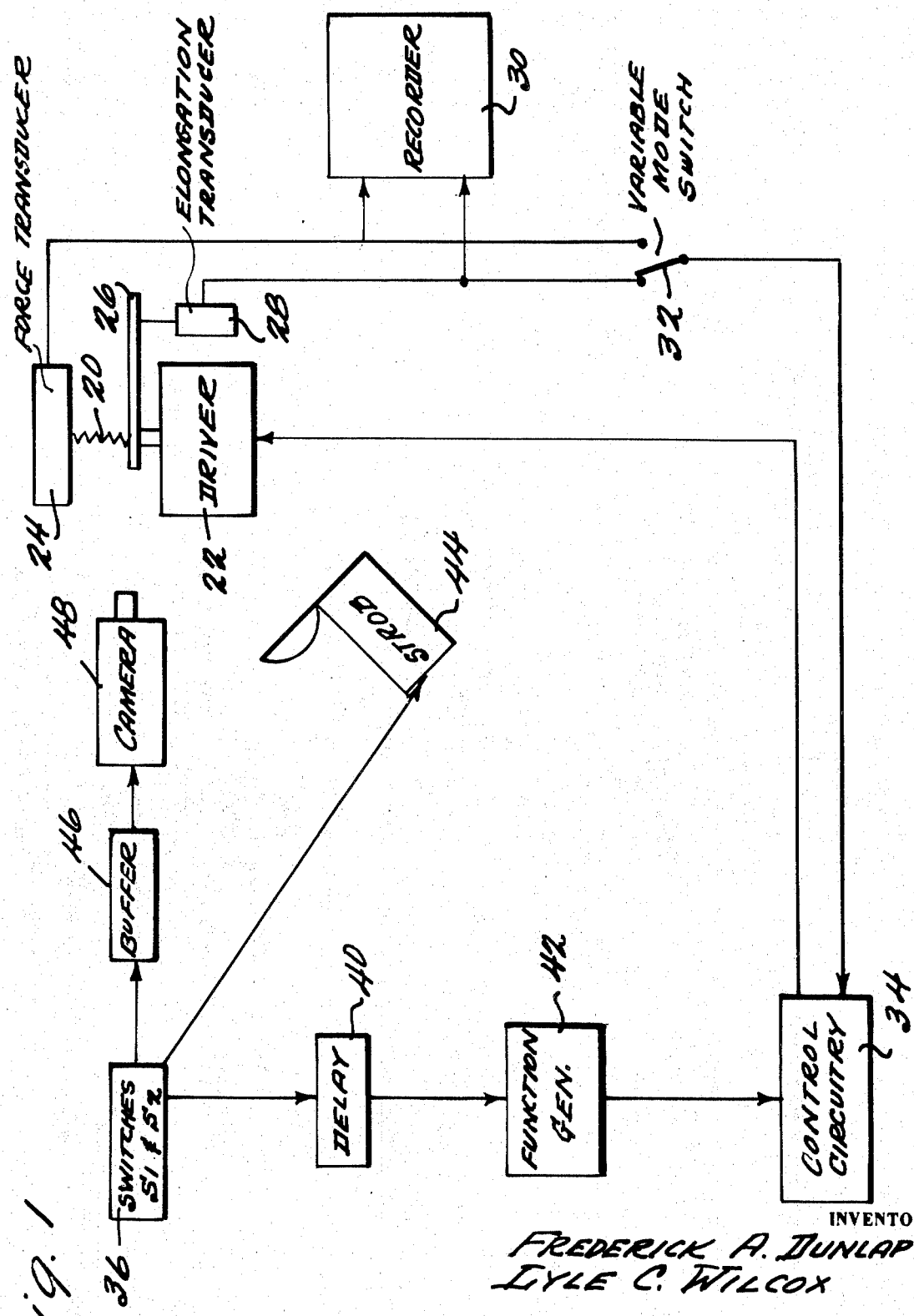
FIG. 1 shows in block diagram the novel system of this application for testing strands and recording the results of those tests.

Reference is now made to FIG. 1 which illustrates in block diagram the novel system of this application. As mentioned above, a test strand 20, such as textile yarn or the like, is mounted between driver 22 and a conventional force transducer 24. One force transducer found to be satisfactory is available from Narco Bio-Systems (formerly E & M Instruments) as Model F-1000. Many other conventional transducers can be employed. The end of strand 20 attached to driver 22 is also coupled via a lever arm 26 to a second conventional displacement or elongation transducer 28 which operates to produce a which which varies in accordance with the elongation of the strand being tested. Satisfactory displacement transducers are available from Hewlett-Packard under Model 7DCDT-050. Transducer 24 similarly produces a signal which varies with the force applied by unique driver 22. The major difference between the two transducers is that the armature in a force transducer moves substantially less than the corresponding armature in the displacement transducer.

As shown in FIG. 1, the two signals generated by transducer 24 and 28 respectively are applied to a conventional graphic recorder 30 which provides a record of the elongations and the applied forces. Further, the signals generated by transducers 24 and 26 are connected to a manually operated, variable mode switch 32 which has at least two positions. In the illustrated position switch 32 passes the signals from transducer 28 to control circuitry 34, and in this mode of operation the force signal generated by control circuit 34 and applied to driver 22 varies as a function of the elongation detected by transducer 28 as will be apparent from the discussion below. In the alternative position of switch 32, the signal from force transducer 24, rather than the signal from transducer 28, is coupled to control circuitry 34 so that the force signal applied by circuitry 34 to driver 22 is a function of the detected force.

Figure 3:
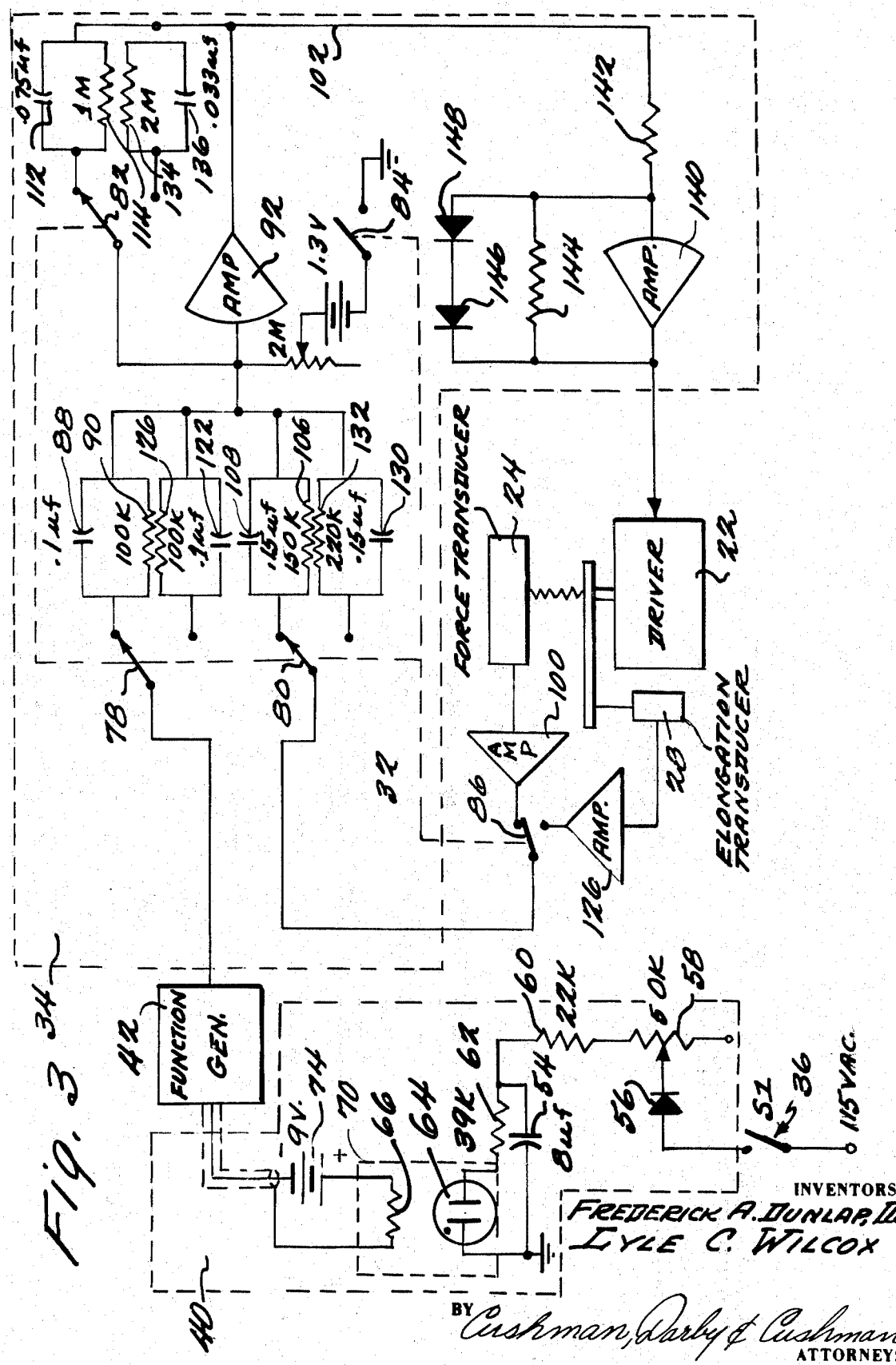
FIG. 3 shows a further block diagram of the delay circuitry and the control circuitry shown in block diagram in the system of FIG. 1.

The testing operation is initiated by manual operation of switches S1 and S2, indicated as block 36 in FIG. 1. Operation of switch S1, as shown in FIG. 3, causes an enabling signal to be produced and applied, after a delay by circuitry 40, to a conventional function generator 42. Hewlett-Packard Type 3300A function generator with a Type 3202A trigger phase lock plug in has been found quite satisfactory. This model will generate sine triangular or square waves at any desired frequency between 0.01 Hertz and 100,000 Hertz. The output of generator 42 is applied to circuitry 34 where it is continuously compared with the input signal from either transducer 24 or 28. An error correction or force signal is then generated by circuitry 34 and applied to driver 22 so that the force or elongation is varied in accordance with the program signal generated by function generator 42. As discussed above, that signal may be a ramp or triangular signal which operates to maintain the rate of elongation or the rate of force application constant. The manual operation of switch labelled 36 also generates a signal which causes a stroboscope to illuminate the strand being tested as discussed in detail below.

Further, the operation of the switches labelled 36 causes buffer 46 to apply, at a gradually increasing rate, a direct current voltage to the drive motor of camera 48 which causes that motor to drive film through the camera without an abrupt start which might break the film. The purpose of delay circuitry 40 is to permit the camera to be in full operation before testing begins.

Figure 2:
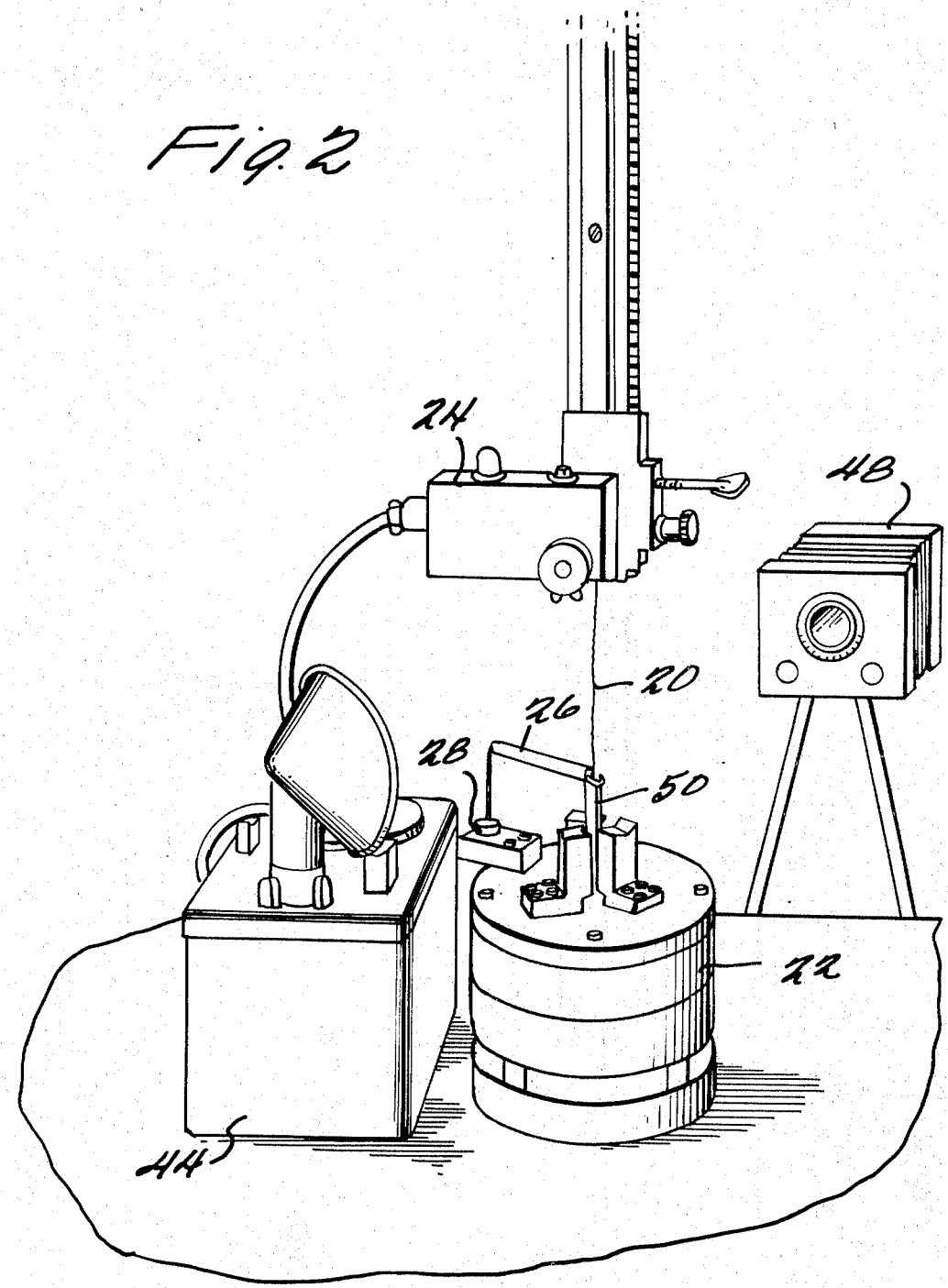
FIG. 2 shows a perspective view of a portion of the system of FIG. 1.
Figure 4:
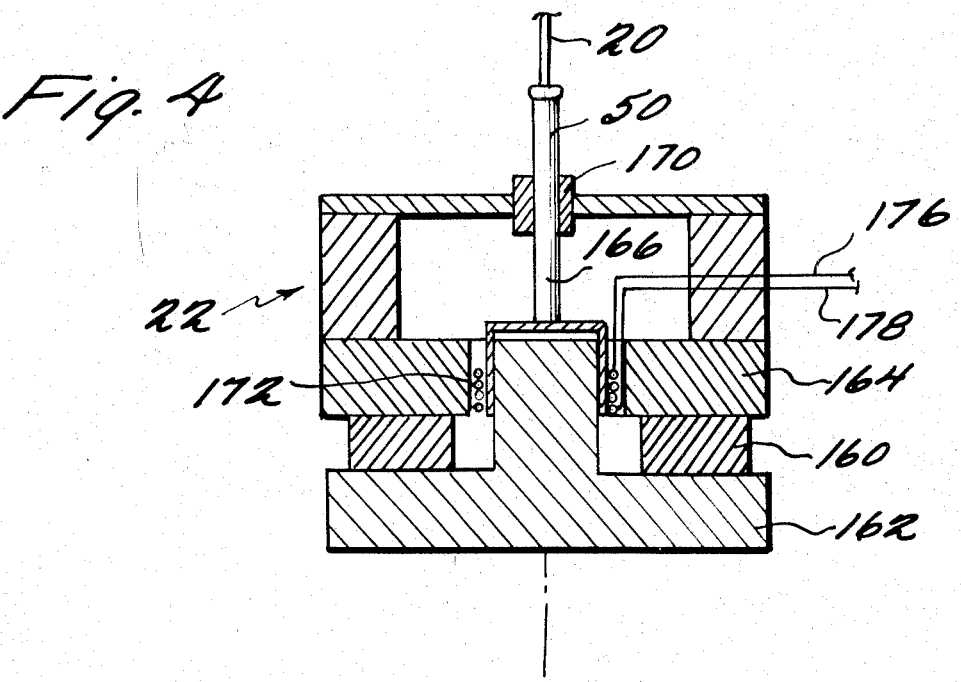
FIG. 4 shows a cut-away view of the driver shown in the system of FIG. 1.

FIG. 2 shows a perspective view of a portion of the system of FIG. 1 with a strand 20 fixed between a portion 50 of driver 22 such as can be better seen in FIG. 4, and conventional force transducer 24. Elongation transducer 28 is coupled as shown via lever 26 to the point of attachment of strand 20 to member 50. Stroboscope 34 and camera 40 are positioned as shown to provide a photographic record of the test.

A Fastax 16mm, 8,000 frame per second camera can be used but the camera uses 100 feet of film in eight-tenths of a second, allowing only one test per reel of film. Clearly, cost precludes using this approach in exploratory or research efforts. Also, since the pictures of the yarn are framed, projecting is the only convenient method of studying the breaks. The Fastax will show that the final separation of yarns occurs very rapidly and a high speed is needed to capture a break. A more meaningful display of the yarn plus a more economical method of taking pictures is possible by using a shutterless camera. The camera drives the film at a constant rate while stroboscopic light is used to stop the motion of the yarn.

A General Radio 1538A stroboscope has been used at a 400 flash per second rate. This is the maximum rate that can be used with Tri-X film (ASA400) because the light output goes down as the rate increases. A film speed of 25 inches per second is required to get an exposure density of one exposure per one-sixteenth inch of film.

A motor drive has been designed to fit an Exakta camera, giving film speeds from zero to 35 inches per second. In order to allow a number of breaks to be taken, a 100 foot film magazine was used for the camera allowing 20 to 30 tests to be made per 100 feet of film. A take-up motor was used to reel the exposed film onto an empty spool. The take-up motor was operated in a stall mode at all times, with a very small voltage placed on the motor while the camera was not running so that the film did not unwind. With this driver, buffer circuit 46 permits the drive motor and hence the film to be accelerated slowly up to a maximum speed of 35 inches per second in less than two seconds.

Another problem is to determine whether the film is running properly and when the film runs out. A magnet was connected to the take-up reel spindle and a small compass is placed directly over the take-up spindle on the top cover of the film magazine. When the compass turns, the take-up reel is turning.

Using this technique the operation of the film can be determined as follows: When the camera is running, the compass should be turning. If the film tears out at the sprocket, the take-up reel does not turn, hence the compass does not turn. If the compass does not stop when the camera is turned off, the 100 feet of film has been used as the reel continues to travel because of the small bias tension placed on the film by the take-up motor. The magnetic coupling allows a simple, light-tight coupling between the inside and outside of the camera.

Reference is now made to FIG. 3 which illustrates in block diagram further details of the invention. As indicated above, the testing is initiated by manual operation of the switches labelled 36, including switch S1 shown in FIG. 3. Closing switch S1 applies a rectified D.C. voltage across capacitor 54 via rectifying diode 56, variable potentiometer 58 and resistance 60. A further resistance 62 and a neon lamp 64 are connected serially with respect to each other and in parallel with capacitor 54 which slowly charges. When the capacitor 54 reaches a pre-determined level, e.g., 65 volts, lamp 64 illuminates and shines on photoresponsive element 66 which is preferably housed with lamp 64 to form a photomodule 70 such as a Clairex photomodule. The conduction of photoresistor 66 connects 9-volt source 74 to function generator 42 via a co-axial cable which shields against noise so as to enable generator 42 which thereupon begins producing its programming signals. Photomodule 70 also permits function generator 42 to float above ground.

The output of generator 42 is connected to a switch 78 which is ganged for operation with switches 80, 82, 84 and 86 in either the illustrated position in which the system is responsive to the detected force or an alternative position in which the force applied varies as a function of the detected elongation and varies that elongation according to the program signal provided by generator 42. In the illustrated position the programming signal is applied via an input circuit comprising a capacitor 88 and resistor 90 to a conventional operational amplifier 92. The signal generated by transducer 24 is also applied via switch 86 and amplifier 100 to the same input to amplifier 92 which thus operates to compare the two signals and generate an error or force signal on line 102 which will cause driver 22 to decrease the difference between the two compared signals. The signal from transducer 24 is coupled to amplifier 92 via a similar input circuit comprised of a resistor 106 and a capacitor 108. Likewise, when switches 78, 80, 82, 84 and 86 are in their illustrated position, switch 82 connects a feed-back switch comprised of a capacitor 112 and a resistor 114 in feed-back relation about amplifier 92.

In the second mode of operation, switches 78, 80, 82, 84 and 86 shift from their illustrated positions so that the signal from function generator 42 is coupled to the input to amplifier 92 via resistor 120 and capacitor 122. Similarly, the output of elongation transducer 28 is applied to the input to amplifier 92 via amplifier 126, switch 80 and the input circuit comprised of capacitor 130 and resistor 132. In this alternative position switch 82 connects resistor 134 and capacitor 136 in feed-back relation about amplifier 92; and switch 84 connects a small D. C. voltage to the input to amplifier 92 as discussed below.

The force signal on line 102 is applied to driver 22 via a conventional operational amplifier 140 which has an input resistance 142 and a feed-back resistance 144. Diodes 146 and 148 are connected in parallel with resistor 144. The signal thus applied to driver 22 operates to vary the force applied in accordance with the programming signal provided by function generator 42 and as a function of either the force or elongation depending upon the position of switches 78, 80, 82, 84 and 86.

The input and feed-back elements for amplifier 92 and their values were established by using an analog computer. The first step in the simulation was to model the input driver, then the control system was modeled and combined with the driver.

The driver was assumed to be a spring, dash pot, and mass system mechanically, plus an electromagnetically coupled driving force. Assuming K is the spring constant which corresponds to that of the yarn or load placed in the driver, when no yarn is in the driver, K is equal to zero. D is the natural damping caused by viscous friction plus the air pocket under the voice coil. M is the mass of the voice coil assembly. R is the electrical resistance of the voice coil while L is the inductance of the voice coil. V is the voltage applied at the input terminals of the driver.

The mechanical system was analyzed by summing the forces in the $y$ direction. The force is the electromagnetic force given by $f = Bli$ where B is the flux density, $l$ is the length of wire perpendicular to the field, and $i$ is the current passed through the wire. The term $Bl$ is a constant assuming that flux density remains constant throughout the entire stroke. Making this assumption, the equation becomes $$M\ddot{y} + D\dot{y} + Ky = Bli.$$

To get the equation in terms of the input voltage, the electrical system must be analyzed. Summing the voltage around the loop yields $$V = Ri + L(di/dt) + Bl\dot{y},$$

where $Ri$ is the voltage drop across the resistance, $L(di/dt)$ is the voltage drop across the inductance, and $Bl\dot{y}$ is the counter emf developed by the magnetic field. The inductance $L$ is so small that it is neglected. The resulting equation is $$V = Ri + Bl\dot{y}.$$

Solving for $i$ and substituting into the above equation yields $$M\ddot{y} + [D + (B^2l^2/R)]\dot{y} + Ky = (Bl/R) V.$$

With the equation of the transducer and the equations of the controller, the system can be simulated on an analog computer. The mass is determined by weighing the voice coil assembly. The spring constant is a value determined from the yarns. Using this technique yields a reasonable approximation to the system, however, this approach does not use one of the strong points of the analog computer. That is a component can be physically substituted into the computer simulation and no approximation needs to be made. The non-linearity of the field as well as bearing friction is taken into account using this latter technique.

Optimization of the driving system was not straight forward because the yarn does not present an easily described load. The load varies with percentage blend, yarn type, sizing, etc. For a programmable displacement, the system overshoot is one of the main parameters to be minimized. When the yarn slips, the transducer should not overextend the yarn. The overall design criterion is to have maximum system stiffness with minimum overshoot. A minimum integral square error function is used for the programmable displacement mode and the input and feed-back elements to amplifier 52 provide this function.

A proportional system exhibits excessive offset error. By using parallel resistor-capacitor inputs to the controller amplifier 92 with a capacitor as the feed-back element a proportional plus integral system can be examined. This configuration gives the amplifier a gain which is the ratio of the feed-back impedance to the input impedance. Using the proportional plus integral control reduces the integral square error a great deal. The performance is improved still further by paralleling a resistor with the feed-back capacitor which yields the following transfer function:

$$e_{out}(s)/e_{in}(s) = (R_2/R_1)[(1 + R_1C_1S)/(1 + R_2C_2S)]$$

where $R_1$ and $C_1$ are associated with the input elements to amplifier 92 and $R_2$ and $C_2$ are associated with the feed-back elements.

For the programmable force mode a completely different problem exists. The system uses the force transducer as its feed-back source. When the yarn breaks, the feed-back path is broken. This causes the system to saturate violently with potential damage to the driver. Use of a nonlinear control system avoids this problem. The effect of opening the feed-back loop is countered by forcing the control unit to saturate in an upward direction when the feed-back loop is broken. The saturation level is limited by a diode in the feed-back path of the operational power supply. This keeps the rated output current of the supply from damaging the transducer.

The force mode of operation must be optimized using yarn. As the stiffness of the yarn changes, the gain of the operational power supply must be reset. The battery and the potentiometer operate to return the driver to the upright position after the test cycle is completed.

Reference is now made to FIG. 4 which illustrates a cut-away view of the novel driver shown in block diagram in FIG. 1. Driver 22 includes an annular shaped permanent magnet 160 which is disposed in a housing including a base member 162 and an annular shaped member 164 with magnet 160 disposed between members 162 and 164. A further member 166 has a hexagonal shaped rod portion which extends upward through a linear bearing 170 and to which is attached the strand 20 to be tested. A coil is wound about the lower portion of member 172 and member 166 is disposed for linear movement with respect to magnet 160. The input force signal applied to lines 176 and 178 generates a magnetic field which interacts to the magnetic field produced by magnet 160 to cause a force to be applied to strand 20 along its length.

It is desirable that the system be able to break yarn samples at least 2 to 4 inches long. Since most blended yarns will break with 25 percent elongation, a 1 inch stroke is thus a desirable excursion for the driver or input device. A search through commercially available equipment has shown that the only available driver that approaches the desired characteristics is a M. B. Electronics, E. A. 1250 shaker. The shaker has a very stiff suspension, and its maximum excursion is less than one inch. The suspension dissipates a large amount of energy in moving with no yarn attached. Furthermore, a large amount of current is needed to keep the driver in the raised position while waiting for a new sample. The problem has been solved by using a design similar to that of a loudspeaker with the elimination of the suspension. The magnet structure remains stationary while a moving coil is allowed to move through the field created by the magnet.

A University C-15 H.C. 15-inch speaker magnet has suitable characteristics for the driver. A one inch displacement is necessary on the driver, unfortunately the pole pieces of the magnet structure are not deep enough to allow a linear excursion of 1 inch. In order to dissolve the glue holding the magnet from the pole pieces, it was necessary to soak the structure in acetone for at least a day. The attraction of the magnet on the pole pieces is sufficiently strong to necessitate great care in disassembly. A press was used to separate the magnet from the pieces, as several hundred pounds of force are necessary to pull the pieces apart.

The first amplifier used could produce one ampere and the yarns tested broke around 300 grams. For these reasons one ampere was used to produce 500 grams tension. The analysis of the driver proceeds as follows.

From electromagnetics, the equations describing the operation of the driver are $$f = Bli,$$
$$e = N(d\phi/dt),$$
$$B = \phi/A,$$

where $f$ is the force in newtons, $B$ is the flux density in webers per square meter, $l$ is the length of wire perpendicular to the field in meters, $i$ is the current flowing through the wire in amperes, $e$ is the voltage across the coil, $N$ is the number of turns of wire, $\phi$ is the flux in webers, and $A$ is the area in square meters over which the flux is distributed.

The physical dimensions of the magnet dictate the basic design of the magnet structure. Furthermore, to keep the transducer as linear as possible, it is desirable to make the structure deep enough to have a minimum of the moving coil wires pass into the fringe region of the pole pieces. The magnet structure was designed around these boundary conditions. Since no latitude is provided in the magnet structure, the coil is the part which is to be designed to meet the 500 grams per ampere criterion.

To establish the coil design, the flux produced by the magnet structure was determined. Separating the variables in the above equation yields:

$$edt = Nd\phi.$$

Integrating both sides yields $$\int_0^{t_1} edt = N \int_0^{\phi(t_1)} d\phi.$$

It is noted that the time integral of the voltage is proportional to the flux lines cut by the moving coil. An analog computer can be used to obtain the time integral while a one turn coil is passed through the magnet gap. Using the above equations and the circumference of the moving coil, the least number of turns of wire was found to be approximately 70. In order to have a factor of safety, 140 turns of wire were used yielding actual sensitivity of 720 grams per ampere.

A linear ball bearing 170 is used to center the coil in the field of magnet 160 and three small ball bearings equally spaced running on a hexagonal shaft keep the coil from rotating. FIG. 4 shows the final design of the alignment system.

The coil 172 was wound using four layers, 35 turns each, of 26 gauge copper wire. A centering mandrel was machined to turn the coil form on a lathe and was used to wind the coil. Care was taken not to place too much tension on the wire while winding as the cumulative effect of the windings can cause the thin coil form to grip the mandrel so tightly that it can not be removed. Epoxy glue was used to secure the winding to the coil form as well as to aid in transferring the resistive heat away from the coil. Flexible wire was used to connect the coil to the main body of the transducer.

The nonlinearity of driver 22 was less than one percent which means that for very slow tests a programmable current would produce a corresponding programmed force. This can be seen by recalling that the force produced by the driver is $$f = Bli.$$

Since the flux density $B$ is approximately constant, the force is proportional to the current. For higher speed tests, the mass of the moving coil plus the friction of the alignment system causes unacceptable results, since the force placed on the yarn is no longer proportional to the current passing through the moving coil.

The programmable displacement mode can not be obtained using an open loop system because the driver is essentially a current to force converter. In order to obtain the programmable displacement mode or, for that matter, a high speed programmable force mode, a closed loop control system was used as discussed above.

Figure 5:
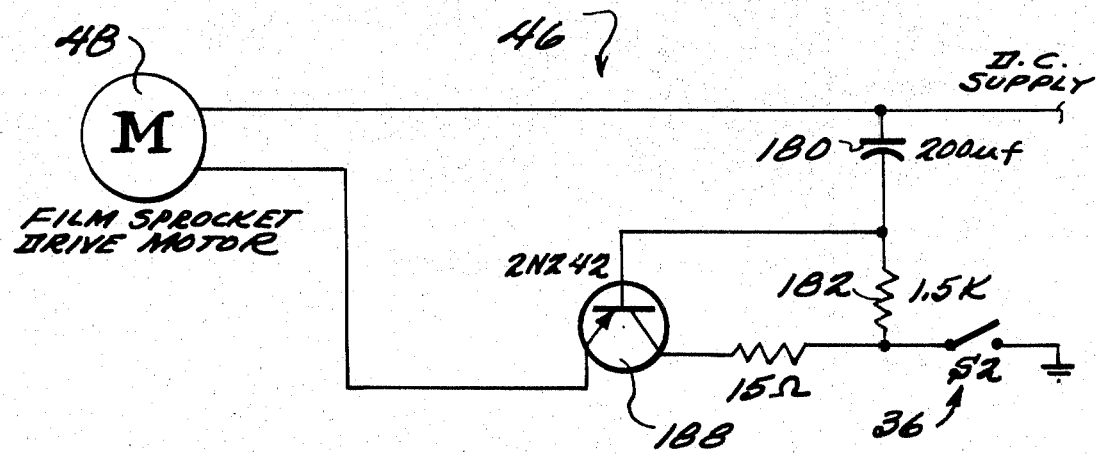
FIG. 5 shows a schematic of the buffer circuit shown in block diagram in the system of FIG. 1.

Reference is now made to FIG. 5 which presents a further schematic of the buffer circuitry 46 shown in block diagram in FIG. 1. As indicated above, it was discovered that when a D.C. voltage was abruptly applied to a film sprocket drive motor, the result was frequently a breakage of the film. Accordingly, buffer circuitry 45 operates to apply the D.C. voltage gradually so that the acceleration of the motor is not so great as to damage the film. Closing of the switch S2, which may be ganged for movement with switch S1, connects the D.C. voltage across capacitor 180 via resistor 182 so that capacitor 180 begins charging and the voltage applied to the base of transistor 188 gradually increases. As the base voltage increases, the resistance of transistor 188 between the emitter and collector decreases and the voltage applied to the drive motor 48 is increased gradually so that that motor comes up to speed.

Representative values are given in the schematic for many of the electronic elements although no limitation to these values is intended. Indeed, many other changes and modifications in the above embodiments of the invention can be made without departing from the scope of the invention and accordingly, that scope is intended to be limited only by the scope of the appended claims.

What is claimed is:

1. A strand testing apparatus comprising:
   means for mounting a strand to be tested,
   means responsive to a force signal for applying a force having a magnitude which varies in accordance with said force signal to said strand along its length so as to cause elongation,
   means for detecting the force applied to said strand and providing an electrical signal indicating that force, 1
   means for determining the elongation of said strand and providing an electrical signal indicating that elongation,
   selectable means having a first condition responsive to said force indicating signal for generating said force signal and varying the magnitude thereof as a function of the force indicating signal and having a second condition responsive to said elongation indicating signal for generating said force signal and varying the magnitude thereof as a function of the elongation indicating signal, including a function generator for producing an electrical programming signal, means for comparing said electrical programming signal with the electrical signal produced by the means to which said selectable means is connected by said switch means and generating a force signal having a magnitude so as to decrease the difference between the electrical programmed signal and the electrical signal with which it is being compared, and
   means for connecting said force detecting and providing means and said elongation determining and providing means including switch means having a first position connecting said selectable means to said force detecting means and a second position connecting said selectable means to said elongation determining means.

2. A strand testing apparatus as in claim 1 wherein said force applying means includes:
   a driver housing,
   a magnet having a magnetic field,
   means for mounting said magnet within said housing,
   a movable member having a portion for applying a force to an object connected to it,
   a coil of wire wound about said member,
   means for supplying an electrical input signal to said coil so as to generate a magnetic field which interacts with the field of said magnet and which varies in strength with said electrical input signal, and
   means for defining a path of travel for said member within said housing toward and away from said magnet so that the force applied by said portion of said member varies in accordance with the electrical input to said coil.

3. Apparatus as in claim 1 wherein each of said detecting means includes a transducer.

4. Apparatus as in claim 1 further including manually operable switch means for providing an enabling signal to said function generator and means for delaying the application of said enabling signal to said function generator after operation of said switch.

5. Apparatus as in claim 4 further including a camera, means mounting said camera for photographing said strand and means connecting said camera to said manually operable switch means for operating said camera upon manual operation of said switch means.

6. Apparatus as in claim 5 further including a stroboscope mounted for operation in conjunction with said camera.

7. Apparatus as in claim 4 wherein said delaying means includes means for connecting said switch means to a source of alternating current voltage, means connected to said switch means for receiving and rectifying said alternating current when said switch means is in a closed position, resistive means connected to said rectifying and receiving means, capacitor means connected to said resistive means for charging to the rectified voltage when said switch is closed and discharging when said switch is open, lamp means connected in parallel with said capacitor means for providing a given illumination when a given voltage charge on said capacitor means is reached, and a photo responsive means disposed for receiving the illumination from said lamp means and connected to said function generator for providing an enabling signal to said function generator when said photo responsive means receives said given illumination.

8. Apparatus as in claim 7 wherein said receiving and rectifying means is a diode.

9. Apparatus as in claim 7 further including a camera having a drive motor for driving film through said camera and wherein said switch means further includes a switch operable to connect said drive motor to a source of voltage so as to drive said film through said camera.

10. Apparatus as in claim 9 including means for connecting said switch to said motor for providing a gradually increasing voltage to said motor after said switch is closed so as to bring said motor up to speed gradually and avoid tearing said film.

11. Apparatus as in claim 10 wherein said gradually increasing voltage providing means includes a transistor, means for connecting said drive motor to a direct current voltage source via the emitter and collector of said transistor and said switch, and capacitor means connected between the base of said transistor and said direct current voltage source and connected to said direct current source via said switch so that when said switch is closed said capacitor means charges, increasing the voltage at said base and increasing the conduction of said transistor and the voltage at said motor.

12. An apparatus as in claim 1 further including means for recording the elongation and force applied.

13. An apparatus as in claim 1 wherein said selectable means includes means for generating a voltage signal having a programmable rate of increase.

14. Apparatus as in claim 1 wherein said function generator includes means for generating square wave electrical signals and triangular wave electrical signals.

15. A strand testing apparatus comprising:
means for mounting a strand to be tested,
means responsive to a force signal for applying a force having a magnitude which varies in accordance with said force signal to said strand along its length so as to cause elongation,
means for detecting the force applied to said strand and providing an electrical signal indicating that force,
means for determining the elongation of said strand and providing an electrical signal indicating that elongation,
selectable means having a first condition responsive to said force indicating signal for generating said force signal and varying the magnitude thereof as a function of the force indicating signal and having a second condition responsive to said elongation determining signal for generating said force signal and varying the magnitude thereof as a function of the elongation indicating signal, including means for generating a voltage signal having a programmable rate of increase, an operational amplifier, a first input circuit for said operational amplifier, a second input circuit for said operational amplifier, a third input circuit for said operational amplifier, and a fourth input circuit for said operational amplifier, a first feedback circuit for said operational amplifier, a second feedback circuit for said operational amplifier, and
means for connecting said force detecting and providing means and said elongation determining and providing means to said selectable means including switch means having a first position connecting said first input circuit to said operational amplifier, connecting said force detecting means to said third input circuit, connecting said third input circuit to said operational amplifier and connecting said first feedback circuit to said operational amplifier and a second position connecting said second input circuit to said operational amplifier, connecting said elongation detecting means to said fourth input circuit and connecting said second feedback circuit to said operational amplifier.

16. Apparatus as in claim 15 wherein each said input circuit and each said feedback circuit comprises a parallel connected resistor and capacitor.

17. Apparatus as in claim 15 wherein said switch means includes a plurality of manually operated switches ganged together.

18. A strand testing apparatus comprising:
means for mounting a strand to be tested,
means responsive to a force signal for applying a force having a magnitude which varies in accordance with said force signal to said strand along its length,
programming means for generating said force signal,
a camera having a drive motor for driving film through said camera,
manually operable switch for providing, when operated, an enabling signal to said programming means and to said camera,
means for delaying the enabling signal provided to said programming means, and
means for mounting said camera for photographing said strand.

19. An apparatus as in claim 18 including means for recording the force applied and the elongation.

20. An apparatus as in claim 18 including means for applying a gradually increasing voltage to said drive motor after said switch is operated to avoid tearing said film.

21. In combination:
a camera having a drive motor for driving film through said camera,
a switch operable to connect said drive motor to a source of voltage so as to drive said film through said camera,
means for connecting said switch to said motor for providing a gradually increasing voltage to said motor after said switch is closed so as to bring said motor up to speed gradually and avoid tearing said film including a transistor, means for connecting said drive motor to a direct current voltage source via the emitter and collector of said transistor and said switch and capacitor means connected between the base of said transistor and said direct current voltage source and connected to said direct current source via said switch so that when said switch is closed said capacitor means charges, increasing the voltage at said base and increasing the conduction of said transistor and the voltage at said motor,
means for mounting a strand to be tested operable by said switch for applying a force to said strand, and
means for mounting said camera so as to photograph said strand during said test.

22. In further combination as in claim 21 including a function generator for providing a programming signal for said force applying means which controls the force applied, wherein said switch provides an enabling signal to said function generator and further including means for delaying the application of said enabling signal to said function generator after operation of said switch.

23. Apparatus as in claim 22 wherein said delaying means includes means for connecting said switch means to a source of alternating current voltage, means connected to said switch means for receiving and rectifying said alternating current when said switch means is in a closed position, resistive means connected to said rectifying and receiving means, capacitor means connected to said resistive means for charging to the rectified voltage when said switch is closed and discharging when said switch is open, lamp means connected in parallel with said capacitor means for providing a given illumination when a given voltage charge on said capacitor means is reached, and photo responsive means disposed for receiving the illumination from said lamp means and connected to said function generator for providing an enabling signal to said function generator when said photo responsive means receives said given illumination.

24. In further combination as in claim 23 wherein said force applying means includes a driver.

25. In further combination as in claim 23 wherein said driver includes:
a driver housing,
a magnet having a magnetic field,
means for mounting said magnet within said housing, a movable member having a portion for applying a force to an object connected to it, a coil of wire wound about said member, means for supplying an electrical input signal to said coil so as to generate a magnetic field which interacts with the field of said magnet and which varies in strength with said electrical input signal, and means for defining a path of travel for said member within said housing toward and away from said magnet so that the force applied by said portion of said member varies in accordance with the electrical input to said coil.

* * * * *